United States Patent [19]

Bosch et al.

[11] 4,182,045

[45] Jan. 8, 1980

[54] DEVICE FOR CHECKING INVOLUTES AND HELIX ANGLES OF GEARS

[75] Inventors: Manfred Bosch, Remscheid; Richard Marquadt, Hückeswagen, both of Fed. Rep. of Germany

[73] Assignee: W. Ferd. Klingelnberg Sohne, Remscheid, Fed. Rep. of Germany

[21] Appl. No.: 905,809

[22] Filed: May 15, 1978

[30] Foreign Application Priority Data

May 18, 1977 [DE] Fed. Rep. of Germany ....... 2722452

[51] Int. Cl.² .............................................. G01B 7/28
[52] U.S. Cl. ......................... 33/179.5 D; 33/179.5 R
[58] Field of Search .................... 33/179.5 R, 179.5 D

[56] References Cited

U.S. PATENT DOCUMENTS

| 3,397,459 | 8/1968 | Ehrhardt et al. | 33/179.5 D |
| 3,741,659 | 6/1973 | Jones, Jr. | 33/179.5 R |
| 3,849,891 | 11/1974 | Pratt et al. | 33/179.5 D |
| 3,849,892 | 11/1974 | Fabish et al. | 33/179.5 D |
| 3,945,126 | 3/1976 | Bloch | 33/179.5 R |
| 4,062,125 | 12/1977 | Maag | 33/179.5 D |

Primary Examiner—Richard R. Stearns
Attorney, Agent, or Firm—Becker & Becker, Inc.

[57] ABSTRACT

A device for checking involutes and helix angles of cylindrical gears by electronically compensating for mechanical errors, which includes a mechanically operating transmission chain, especially a rolling transmission, a sine bar, a sliding block linkage and/or a lever transmission, which transmission chain guides a measuring feeler relative to a gear to be checked on the required reference curve. The device furthermore includes one length pick-up each at both ends of the transmission chain for measuring their respective motions, a computer unit for multiplying the signal of one of the length pick-ups with the put-in rated transmission ratio of the transmission chain and for subtracting the multiplied signal from the signal of the other length pick-up, and also includes a device for subtracting with the proper prefix + or − the thus formed difference signal as correction value from the measured value of the measuring feeler.

10 Claims, 1 Drawing Figure

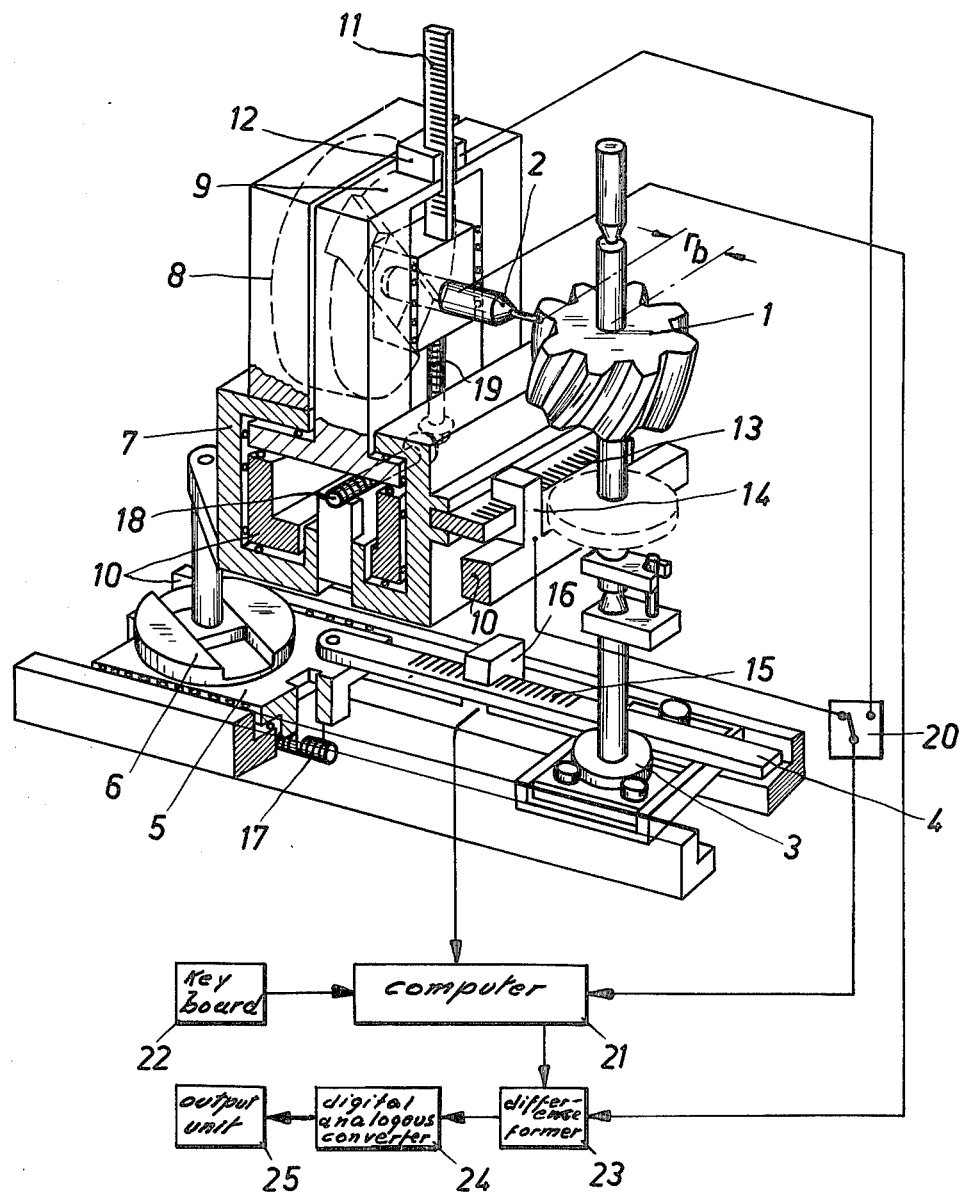

DEVICE FOR CHECKING INVOLUTES AND HELIX ANGLES OF GEARS

The present invention relates to a checking or testing device for involutes and helix angles of cylindrical gears, which checking device is provided with a mechanically operating transmission chain, especially rolling transmissions, sine bar, sliding block linkage (Kulissenfuhrung) and/or lever transmission, which guide the measuring feeler relative to the gear to be checked on the required reference curve. A testing device of this general type is disclosed for instance in German Pat. No. 12 94 033.

In view of greater requirements as to quiet running and transmission provision, especially also with large gears, the necessity arises to be able to measure the teeth still more precisely than it was done heretofore. An increase in the measuring precision of mechanically working devices by increasing the manufacturing precision is not possible any further at economically permissible expenses. In addition thereto, with heavy gears, there exists the possibility that different deformations may occur depending on the respective momentary position of the transmission chain. Furthermore, the friction wear of the kinematically important parts may result in a slow but continuous decrease in the precision. In such an instance, in the course of time, postadjustments or postmachining operations become necessary.

Therefore, a number of different gear testing devices have been developed which realize the reference curve, involute and helical line, by purely electronical means instead of the transmission chain. U.S. Pat. No. 3,849,892—Pratt, et al issued Nov. 26, 1974; describes a device with electronic control according to which the gear to be tested is driven, and a coupled rotary pick-up emits an angle proportional pulse sequence. This pulse sequence is multiplied in a computer unit in such a way that the stepping motor brings about the rated travel of the measuring feeler which travel pertains to the rotation of the testing gear. The feeler tip held by a test load against the tooth flank, indicates the deviations which are measured.

From German Offenlegungsschrift No. 23 64 916, a tooth flank testing device has become known according to which the gear to be tested stands still. The measuring feeler moves driven by means of servomotors in conformity with a predetermined electronic computer program along the reference curve while the deviations of the feeler are measured.

Furthermore, U.S. Pat. No. 3,631,603—Munro issued Jan. 4, 1972 discloses another method according to which a rigid feeler slides along the flank of the gear tooth to be checked so that on the basis of the deviations of the flank, an actual movement between the gear and the feeler is forced. The rotation of the gear and the rectilinear travel of the feeler are electrically measured and the ratio therebetween is established. From the difference to the electronically formed rated transmission ratio, the measuring values for the deviations of the tooth flank are ascertained.

Similar solutions or combinations of the above mentioned devices are disclosed for instance also in U.S. Pat. No. 3,849,891 Pratt, et al issued Nov. 26, 1974.

Further reference may be had to a method of U.S. Pat. No. 3,741,659—Jones issued June 26, 1973; according to which the actual positions of a gear to be tested and a measuring feeler are ascertained by means of rotary incremental digitizer and Laserinterferometer and are post-controlled by servomotors with regard to the rated positions.

The decisive drawback of all the above mentioned known testing devices which purely electronically generate the reference curve is seen in the fact that for purposes of obtaining the required precision, a considerable number of electronic parts are required and high expenses are involved with the result that such devices are very expensive and so far has prevented the common use of such devices. Furthermore, the devices with the electronic control require a greater measuring time in view of the unfavorable control period.

It is, therefore, an object of the present invention to provide a testing device for involutes and helix angles of cylindrical gears with electronic compensation of the mechanical errors which will retain the advantage of mechanically operating devices and by limiting electronic elements to a minimum will create a device which has a high precision and retains this precision even over a longer period of time.

These and other objects and advantages of the invention will appear more clearly from the following specification in connection with the accompanying drawing illustrating an isometric view of the function scheme of an infinitely variable testing device according to the invention.

The testing device according to the invention is characterized by one length pick-up each at the two ends of the transmission chain for measuring their respective motions, and is further characterized by a computer unit which multiplies the signal of one of the length pick-ups by the put-in rated transmission ratio of the transmission chain and then subtracts said signal from the signal of the other length pick-up, and is furthermore characterized by a device for subtracting the thus formed difference signal as correcting value from the measured value of the measuring feeler with the proper prefix + or −.

The effect of provisions claimed according to the present invention consists in measuring the deviation of the tooth flank with regard to a mechanical reference transmission and in connection therewith to compensate for the kinematic transmission errors electronically. Inasmuch as the maximally occurring correction values will by these provisions be kept relatively small, the expense of electronic elements is relatively small and the measuring time is not affected. Furthermore, the provisions according to the invention take advantage of certain advantages of the mechanical realization of the reference movement because said provisions can be more easily followed and observed by the operator and operate with greater sensitivity during manual operation of the device.

Referring now to the drawing in detail, the gear to be checked 1 is rotatable about a vertical axis, while the measuring feeler 2 travels rectilinearly, and more specifically horizontally in the base circle plane when the involute is being tested, and moves vertically parallel to the gear axis when the helix angle of tooth is tested.

The intermediately located transmission chain comprises the following elements: a rolling disc 3, a rolling bar 4, a control slide 5 with rotatable sliding block linkage 6 which makes possible the infinitely variable adjustment of the rolling movement of the rolling slide 7 in conformity with th base circle radius $r_b$. For measuring the helix angle, a second rotatable sliding block linkage 8 is employed which brings about the vertical travel of the measuring feeler when the measuring slide 9 is fixedly connected to the frame 10. At the ends of this transmission chain there are provided high precision length pick-ups, preferably optical incremental scales (Strichgittermasstabe) on the movable part and the pertaining scanning heads on the stationary part, and more specifically the parts 11, 12 on the measuring feeler and measuring slide respectively, the parts 13 and 14 on the rolling slide and frame respectively, and parts 15 and 16 on the rolling bar and the frame respectively. The length pick-ups are adapted to emit signals representing the motions of the final members of the transmission chain. With the specific embodiment shown in the drawing, instead of a scale disc on the gear axle, which is the first member of the transmission chain, a linear scale is provided on the rolling bar which directly follows in the transmission chain.

Because in view of tests on devices of this type, the measuring of a length is overall more precise than the measuring of an angle of rotation in spite of the intermediate rolling motion. The scanning head 16 is directly connected to a computer unit 21, and the scanning heads 12 and 14 are connected to said unit through a changeover switch 20 for the measuring of the involute and helix angle of tooth respectively.

For carrying out a measuring operation for the involutes, the transmission chain is driven by means of a spindle 17 on the control slide if the diameter D of the rolling disc 3 is greater than the base circle diameter $d_b$ or by way of a spindle 18 on the rolling slide in the inverse instance. During these operations, the measuring slide is disengaged from the spindle 19 and is rigidly connected to the rolling slide. The measuring feeler 2 now ascertains in a manner known per se the deviations of the tooth flank with regard to the reference curve which is generated by the illustrated transmission chain but very much approaches the rated involute. At the same time, the length proportional pulse sequences coming from the scanning heads 14 and 16 are converted in the computer unit into BCD coded numerical values and are stored. If spindle 17 is driving, the smaller of the two pulse numbers comes from the scanning head 14. This smaller pulse number is multiplied by the rated transmission ratio of the transmission chain $D/d_b$ which can be put into the computer unit from a keyboard 22. If spindle 18 is driving, at the scanning head 16 the smaller pulse number will occur and the latter will be multiplied by the value $d_b/D$. Subsequently, the computer subtracts the thus formed product from the other i.e., the higher pulse number. This difference signal represents the error of the transmission chain by means of which error the measured value has to be corrected. By the procedure of always multiplying the smaller pulse number by a number greater than one and to compare it with the higher pulse number, the resolution of the incremental scale is best made use of. The correction value is computed each time when one of the two pulse numbers has changed by one digit which means when an incremental scale has been moved for instance by 0.1 micrometer. In a difference former 23 the correction values thus ascertained currently are then subtracted with the proper prefix + or − from the respective measured value of the measuring feeler which respective measured value is preferably likewise as digital number value conveyed to the difference former. This provision is based on the finding that with testing devices of the above mentioned type, the error of the transmission chain is directly superimposed upon the actual deviation of the tooth flank and thus can again be compensated for at the measured value.

After taking into consideration the desired enlarging factor the thus corrected measured value is registered in the output unit 25 by means of the digital analogous converter 24.

When measuring the helix angle of tooth, the transmission chain is, with the measuring slide 9 at a standstill, driven via one of the three spindles 17, 18 or 19 in conformity with the most favorable transmission ratio. This also determines the amount of rated transmission ratio which is formed by the following parameters, rolling disc diameter D, base circle diameter $d_b$, and base angle of tooth $\beta_b$ and is multiplied by the smaller pulse number of scanning head 12 or 16. The further computing course is the same as with the measuring of the involute.

Since in extreme cases very slow movements may occur on a transmission element and thereby inherent vibrations may occur, which temporarily bring about a reverse movement, the digital measuring systems are preferably provided with a forward and rearward counter.

It is, of course, to be understood that the present invention is, by no means, limited to the specific showing in the drawing, but also comprises any modifications within the scope of the appended claims.

What we claim is:

1. A device for checking involutes and helix angles of cylindrical gears which includes: means to support a gear to be checked, a measuring feeler for producing a measured value, a mechanically operating transmission chain operable to guide said measuring feeler relative to said gear on a required reference curve, length pick-up means arranged at both ends of said transmission chain and adapted to emit signals representing the motions of linearly movable members at opposite ends of said transmission chain, computing means for multiplying the signal of one of said length pick-up means with the rated put-in transmission ratio of said transmission chain, and for subtracting said multiplied signal from the signal of the other said pick-up means, and means for subtracting with the proper prefix + or − the thus formed difference signal as a correction value from the measured value of said measuring feeler.

2. A device according to claim 1, in which said gear to be checked is rotatable about its axis, and said transmission chain includes therewith means to support said feeler being moved along proper pattern for making involute and helix angle measurement and said measuring feeler moves rectilinearly, and in which said length pick-up means includes incremental scale bar means for measuring the rotation of said gear, for measuring the feeler movement, for measuring the involute and for measuring the helix angle of tooth.

3. A device according to claim 2, in which each of said length pick-up means includes an incremental scale bar, a scanning head and a forward and backward counting device.

4. A device according to claim 2, which includes a forward and backward counting device with said computing means.

5. A device according to claim 1, which includes an incremental scale bar arranged on a rolling bar.

6. A device according to claim 5, which includes a forward and backward counting device with said computing means.

7. A device according to claim 1, in which said gear to be checked is rotatable about its axis, said measuring feeler moving tangentially of said gear for involute checking.

8. A device according to claim 7, in which said transmission chain includes a rolling disc, a rolling bar, a first slide with a first adjustable sliding block linkage and a second slide.

9. A device according to claim 8, in which said transmission chain additionally includes a second adjustable sliding block linkage on the second slide and a third slide carrying said measuring feeler, said length pick-up means being arranged at said rolling bar, said second slide and at said third slide.

10. A device according to claim 1, in which said gear to be checked is rotatable about its axis, said measuring feeler moving parallel to said gear axis for helix checking.

* * * * *